United States Patent
Yong et al.

(10) Patent No.: US 11,265,385 B2
(45) Date of Patent: Mar. 1, 2022

(54) DYNAMIC BLOOM FILTER OPERATION FOR SERVICE DISCOVERY

(71) Applicant: Apple Inc., Cupertino, CA (US)

(72) Inventors: Su Khiong Yong, Palo Alto, CA (US); Christiaan A. Hartman, San Jose, CA (US); Kristen A. McIntyre, Fremont, CA (US); Yong Liu, Campbell, CA (US); Chiu Ngok E. Wong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1768 days.

(21) Appl. No.: 14/721,630

(22) Filed: May 26, 2015

(65) Prior Publication Data
US 2015/0363704 A1 Dec. 17, 2015

Related U.S. Application Data

(60) Provisional application No. 62/010,544, filed on Jun. 11, 2014.

(51) Int. Cl.
| | | |
|---|---|---|
| *H04L 29/08* | (2006.01) | |
| *H04L 67/51* | (2022.01) | |
| *H04W 4/50* | (2018.01) | |

(52) U.S. Cl.
CPC ............... *H04L 67/16* (2013.01); *H04W 4/50* (2018.02)

(58) Field of Classification Search
CPC .......... H04L 67/16; H04W 4/001; H04W 4/20
(Continued)

(56) References Cited

U.S. PATENT DOCUMENTS

| | | | |
|---|---|---|---|
| 7,333,464 B2 * | 2/2008 | Yang | H04L 67/16 370/252 |
| 7,535,884 B2 * | 5/2009 | Stephenson | H04W 52/0216 370/311 |

(Continued)

FOREIGN PATENT DOCUMENTS

| | | |
|---|---|---|
| CN | 101242431 A | 8/2008 |
| CN | 101873335 A | 10/2010 |
| WO | 2015009097 | 1/2015 |

OTHER PUBLICATIONS

Goering et al., "Service Discovery Using Bloom Filters", Proceedings of the twelfth annual conference of the Advanced School for Computing and Imaging (ASCI), p. 219-227, Jun. 2006.*

(Continued)

*Primary Examiner* — Tsu-Chang Lee
(74) *Attorney, Agent, or Firm* — Kowert, Hood, Munyon, Rankin & Goetzel, P.C.

(57) ABSTRACT

This disclosure relates to service discovery using a dynamically configurable Bloom filter. According to some embodiments, various parameters of the Bloom filter may be determined by a first wireless device. The parameters may include a number of services advertised using the Bloom filter, a false positive rate of the Bloom filter, a set of hash functions used with the Bloom filter, and/or a size of the Bloom filter. The Bloom filter may be generated according to the determined parameters. The Bloom filter, along with some or all of the parameters of the Bloom filter, may be transmitted by the first wireless device. A second wireless device may use the Bloom filter as part of a service discovery process to determine whether or not a desired service is available via the first wireless device.

20 Claims, 7 Drawing Sheets

(58) Field of Classification Search
USPC .......................................................... 706/46
See application file for complete search history.

(56) References Cited

U.S. PATENT DOCUMENTS

| | | | |
|---|---|---|---|
| 7,647,329 B1* | 1/2010 | Fischman | G06F 3/0607 |
| | | | 707/999.1 |
| 8,010,407 B1* | 8/2011 | Santoro | G06Q 30/02 |
| | | | 705/14.4 |
| 9,179,305 B2* | 11/2015 | Haddad | H04W 12/06 |
| 2006/0094456 A1 | 5/2006 | Rittle et al. | |
| 2007/0177554 A1 | 8/2007 | Yang et al. | |
| 2009/0016255 A1 | 1/2009 | Park | |
| 2010/0312749 A1* | 12/2010 | Brahmadesam | H04L 67/1097 |
| | | | 707/609 |
| 2012/0011150 A1 | 1/2012 | Swaminathan et al. | |
| 2014/0036912 A1 | 2/2014 | Hui et al. | |
| 2014/0254513 A1 | 9/2014 | Abraham et al. | |
| 2014/0372216 A1 | 12/2014 | Nath et al. | |

OTHER PUBLICATIONS

Ahlgren et al.; "A Survey of Information-Centric Networking"; IEEE Communications Magazine; Jul. 2012; pp. 26-36; vol. 50, No. 7.

Goering, et al.; "Service Discovery Using Bloom Filters"; Processing of the Twelfth Annual Conference of the Advance School for Computing and Imaging (ASCI); Jun. 30, 2006; pp. 219-227.

Office Action, Chinese Application for Invention No. 201510289926.1, dated Feb. 2, 2018, 15 pages.

Outfay, F.; Veque, V.; Bouallegue, R.:"Bloom-filter based combined service and route discovery for mobile ad hoc networks"; 2007 International Conference on Intelligent Pervasive Computing (IPC 2007). IEEE, 2007, S. 188-193. 6 pages.

Broder, A.; Mitzenmacher, M.; "Network applications of Bloom filter; a survey"; Internet mathematices, vol. 1, Apr. 13, 2004, No. 4, S. 485-509. 26 Pages.

* cited by examiner

*900*

| B12-B15 | Hash Functions |
|---------|----------------|
| 0 0 0 0 | H1 |
| 0 0 0 1 | H2 |
| 0 0 1 0 | H3 |
| 0 0 1 1 | H4 |
| 0 1 0 0 | H5 |
| 0 1 0 1 | H6 |
| 0 1 1 0 | H7 |
| 0 1 1 1 | H8 |
| 1 0 0 0 | H9 |
| 1 0 0 1 | H10 |
| 1 0 1 0 | H11 |
| 1 0 1 1 | H12 |
| 1 1 0 0 | H13 |
| 1 1 0 1 | H14 |
| 1 1 1 0 | H15 |
| 1 1 1 1 | H16 |

*FIG. 9*

DYNAMIC BLOOM FILTER OPERATION FOR SERVICE DISCOVERY

PRIORITY INFORMATION

This application claims priority to U.S. provisional patent application Ser. No. 62/010,544, entitled "Dynamic Bloom Filter Operation for Service Discovery," filed Jun. 11, 2014, which is hereby incorporated by reference in its entirety as though fully and completely set forth herein.

FIELD

The present disclosure relates to wireless communication, including techniques for utilizing a dynamically configurable Bloom filter for service discovery in wireless communication systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1xRTT, 1xEV-DO, HRPD, eHRPD), IEEE 802.11 (WLAN or Wi-Fi or WiGig), IEEE 802.16 (WiMAX), Bluetooth, and others.

In many instances, service discovery techniques for detecting services and devices available to a device may be used in conjunction with wireless communication. However, frequently, service discovery techniques require IP connection setup to be performed before service discovery can be performed. In wireless communication contexts, this may require associating with a wireless network before knowing what services are available in the network.

SUMMARY

This document describes, inter alia, methods for service discovery in wireless communication contexts using a dynamically configurable Bloom filter, and describes wireless devices configured to implement the described methods.

According to the techniques disclosed herein, a wireless device, such as a Wi-Fi access point, may provide access to one or more services (e.g., by way of communicative coupling to one or more networks). In order to compactly advertise the services available by the device, the wireless device may generate a probabilistic data structure such as a Bloom filter to effectively provide a "service hint map" to other wireless devices seeking for specific services before considering associating with the wireless device.

To generate the Bloom filter, the wireless device may determine how many services are to be advertised using the Bloom filter, and may set a desired false positive rate resulting from use of the Bloom filter. Based on these parameters, the number of hash functions to use with the Bloom filter and the length of the Bloom filter may be determined. The Bloom filter may then be generated using these parameters.

The Bloom filter may be transmitted, along with parameter information for the Bloom filter, to other wireless devices, for example in a Wi-Fi beacon or other pre-association communication. Based on receiving this information, such other wireless devices may be able to determine whether the service hint map provides a positive or negative indication of the availability of a desired service via the wireless device, and to determine the maximum likelihood of a false positive indication.

Thus, such use of a Bloom filter may provide wireless devices with the capability to compactly advertise services available and potentially improve the efficiency, speed of discovery, and scalability of wireless service discovery.

A further technique described herein, which may be used in conjunction with a dynamic Bloom filter if desired, may include directly advertising one or more services available via a wireless device. For example, in addition to compactly advertising the availability (e.g., with a prescribed false positive likelihood) of various services using a Bloom filter, a wireless device may also explicitly or directly indicate one or more (e.g., frequently used) services available via the wireless device. This may provide a degree of flexibility in service advertisement that may allow a wireless device to balance efficiency, speed of discovery, and/or other characteristics in a particular wireless communication system depending on the scale, use characteristics, and desired design tradeoffs of that system.

The techniques described herein may be implemented in and/or used with a number of different types of devices, including but not limited to access point devices, cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIG. 9 is a table illustrating exemplary hash function set mappings that may be used in conjunction with service discovery techniques, according to some embodiments.

Figure 1:
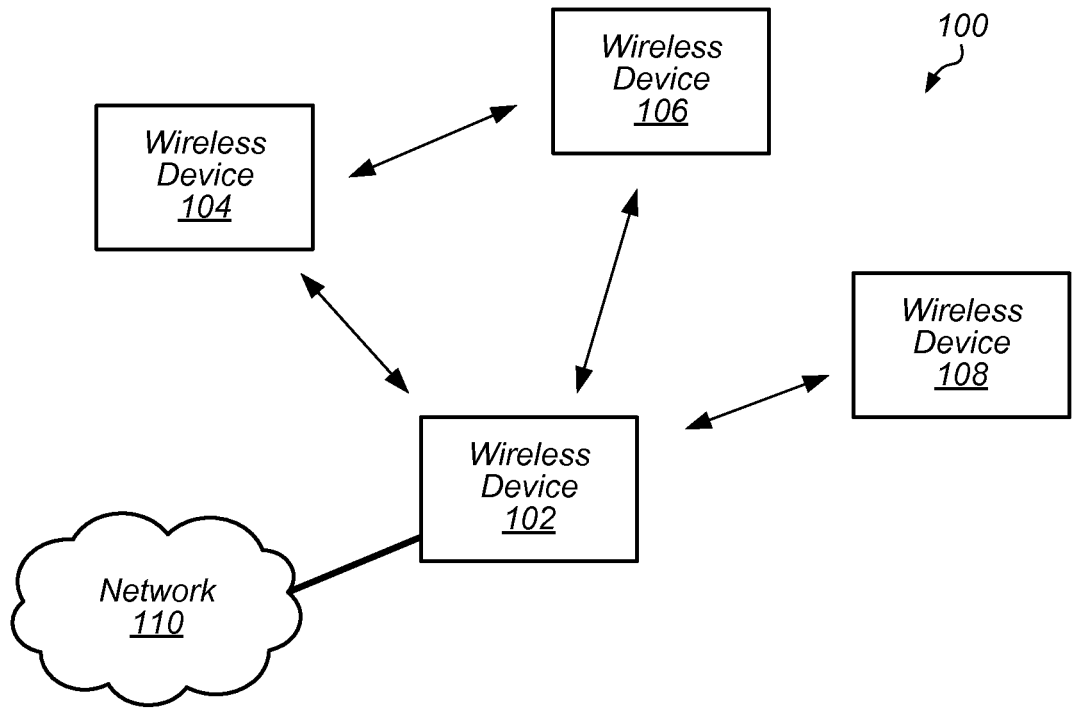
FIGS. 1-2 illustrate exemplary (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "STA" can be broadly defined to encompass any electronic, computing, and/or telecommunications device (or combination of devices) which is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11u, 802.11-2012, 802.11ac, and/or other IEEE 802.11 standards. IEEE 802.11 technology may also be referred to as "Wi-Fi" or "wireless local area network (WLAN)" technology.

Bloom Filter—refers to a class of probabilistic data structure which may be used to test whether or not an element is a member of a set. Generally, a Bloom filter may be configured such that it is possible to obtain a false positive result (with a configurable false positive probability depending on the configuration of the filter), but that a false negative result is not possible.

Figure 2:
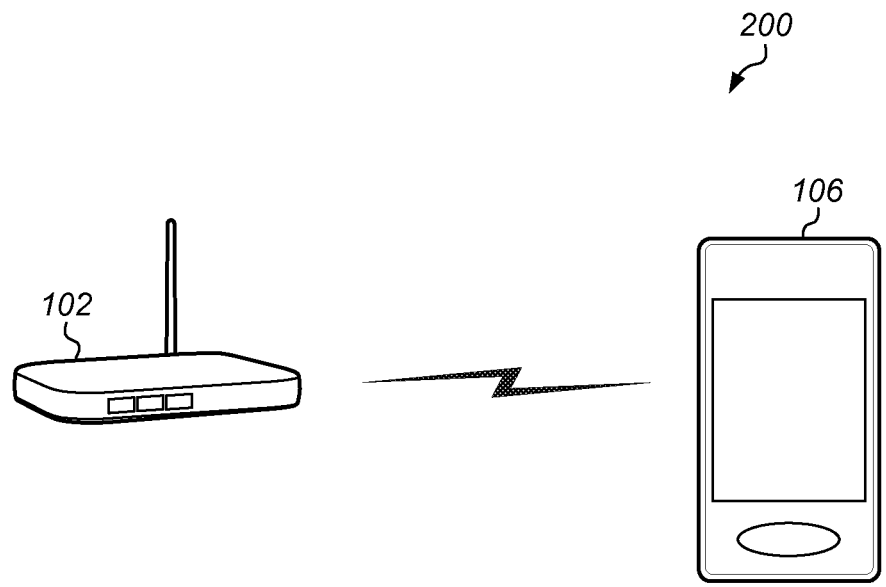

FIGS. 1-2—Communication System

FIG. 1 illustrates an exemplary (and simplified) wireless communication system 100 in which aspects of the present disclosure may be implemented, according to some embodiments. It is noted that the system 100 of FIG. 1 is merely one example of a possible system, and embodiments of the present disclosure may be implemented in any of various systems, as desired. For example, note that although the exemplary wireless communication system 100 illustrated in FIG. 1 is shown as including four wireless devices, aspects of the disclosure may be implemented in wireless communication systems having greater or fewer numbers (i.e., any arbitrary number) of wireless devices.

As shown, the exemplary wireless communication system 100 includes multiple wireless devices 102-108 which communicate over at least one transmission medium. Some or all of the wireless devices may be substantially mobile devices ("stations" or "STAs"). Alternatively, or in addition, some or all of the wireless devices may be substantially stationary.

The wireless devices 102-108 may be capable of communicating over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106 directly. Wireless device 108 may, however, be able to indirectly detect wireless devices 104 and 106, e.g., via wireless device 102. The wireless devices 102-108 may be configured to perform IEEE 802.11 (Wi-Fi) wireless communication and/or other forms of wireless communication according to aspects of the present disclosure.

One or more of the wireless devices may be equipped to communicate with one or more external networks. For example, as shown, wireless device 102 may be communicatively coupled to network 110. The external network(s) may be any of a variety of types of networks, such as a cellular service provider's core network, the Internet, or an organization's intranet, among various possibilities.

One or more of the wireless devices may be equipped to provide access to one or more services or devices. For example, the wireless device 102 may provide access to one or more services (which may be provided by the wireless device 102 itself, and/or may be provided by way of one or more devices communicatively coupled to the wireless device 102, for example by way of one or more network connections). The services offered may depend on the context of the wireless communication system. For example, an AP providing a wireless network in a mall might provide such services as a mall directory and/or map service (e.g., with location service), on-sale and coupon service(s), printing services, etc. Note that any of numerous possible other services may alternatively or additionally be provided in any of various possible other scenarios (e.g., airport, coffee shop, etc.).

Note that in some instances, the wireless devices may be capable of communicating prior to associating together to form a wireless network. Such 'pre-association' communication may include exchange of service discovery related information by way of beacons, probe requests and responses, generic advertisement service queries and responses, etc., and/or exchange of information for associating together (e.g., for a STA to join the wireless network of an AP, for two STAs to form a peer-to-peer association, etc.). Performing such pre-association service discovery may allow devices to determine whether desired services are available prior to spending time and consuming power to associate.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi Direct, etc.) and at least one cellular communication protocol (e.g., GSM, UMTS, LTE, LTE-Advanced (LTE-A), 3GPP2 CDMA2000 (e.g., 1xRTT, 1xEV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 4:
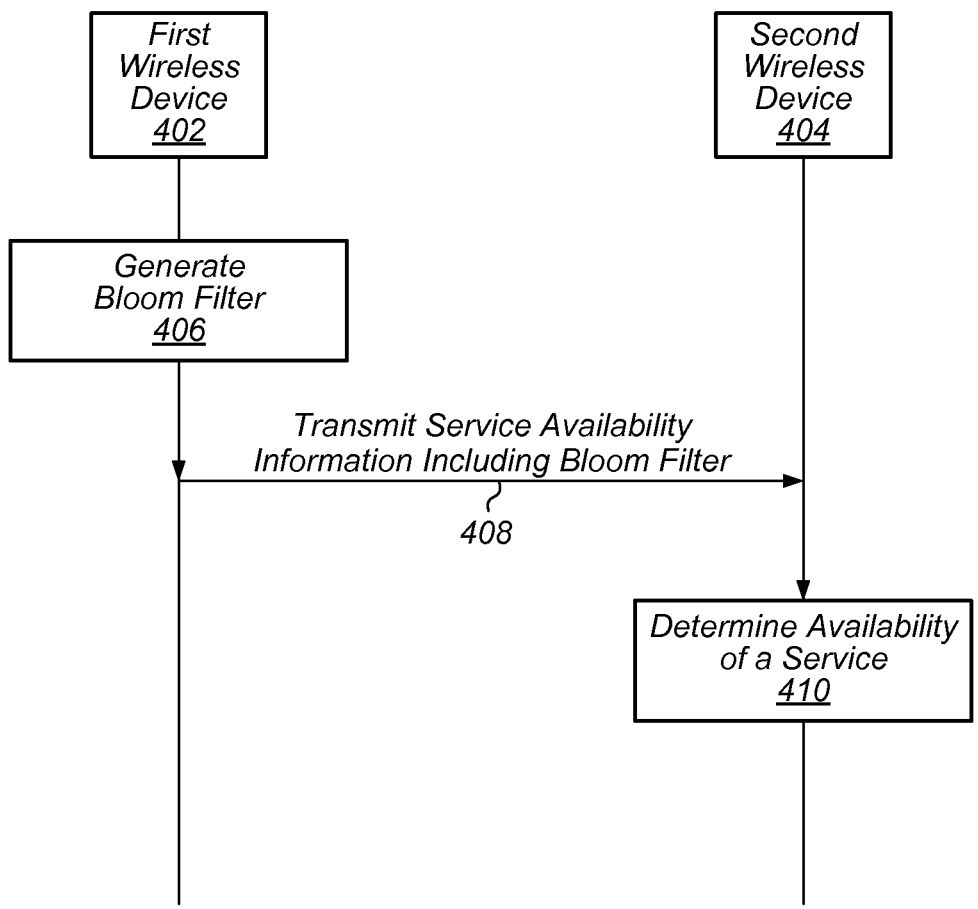
FIG. 4 is a signal flow diagram illustrating aspects of an exemplary method for using a Bloom filter as part of service discovery in a wireless communication system, according to some embodiments.

Any or all of the wireless devices 102-108 and/or the network 110 illustrated in FIG. 1 may be configured to implement or support implementation of part or all of the methods described herein, including, inter alia, the method of FIG. 4.

FIG. 2 illustrates an exemplary wireless communication system 200 in which possible example aspects of the system 100 of FIG. 1 are represented, according to some embodiments. As shown, in the illustrated system wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a handheld device, a computer or a tablet, or virtually any type of wireless device. The AP 102 may be an access point device with Wi-Fi communication capability, such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
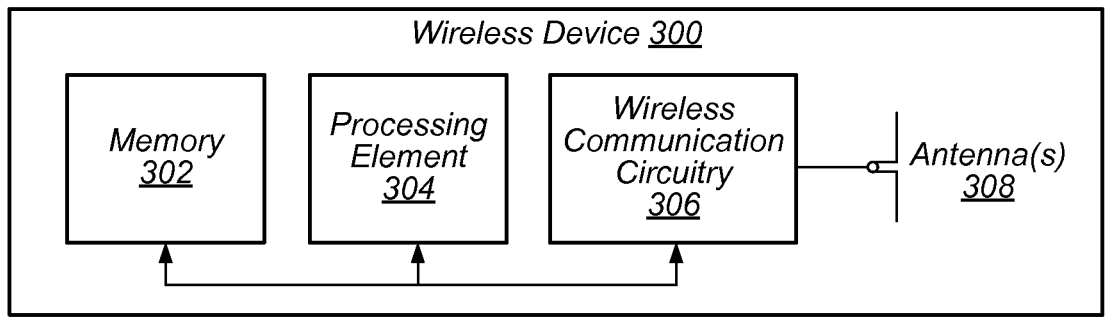
FIG. 3 illustrates a block diagram of an exemplary wireless device, according to some embodiments.

FIG. 3—Exemplary Block Diagram of a Wireless Device

FIG. 3 illustrates an exemplary block diagram of a wireless device 300 that may be configured for use in conjunction with various aspects of the present disclosure, according to some embodiments. The device 300 may be any of a variety of types of device and may be configured to perform any of a variety of types of functionality. For example, the device 300 may be a substantially portable device (a mobile device), such as a mobile phone, a personal productivity device, a computer or a tablet, a wearable device, a handheld gaming console, a portable media player, etc. Alternatively, the device 300 may be a substantially stationary device, such as a television, a subwoofer, speaker, or other audio rendering device, a wireless access point, a set-top box, etc.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and include one or more radios. In general, a radio may include any combination of a baseband processor, analog RF signal processing circuitry (e.g., including filters, mixers, oscillators, amplifiers, etc.), or digital processing circuitry (e.g., for digital modulation as well as other digital processing). A radio may implement one or more receive and transmit chains using the aforementioned hardware. In some instances, the wireless device 300 may share one or more parts of a receive and/or transmit chain between multiple wireless communication technologies, such as those discussed herein above. The wireless communication circuitry may be coupled to one or more antennas 308.

Note that if desired, the wireless communication circuitry 306 may include an on-board processing element in addition to processing element 304; for example, processing element 304 may be an 'application processor' while wireless communication circuitry 306 may include its own 'baseband processor'; alternatively (or in addition), processing element 304 may provide processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip and/or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and/or software components for implementing features for service discovery using a probabilistic data structure, such as a Bloom filter, in a wireless communication system, such as those described herein with reference to, inter alia, FIG. 4.

FIG. 4—Signal Flow Diagram

FIG. 4 is a signal flow diagram illustrating an example method that may be used for performing service discovery in a wireless communication system, such as an IEEE 802.11 wireless communication system, according to some embodiments. The method may be used to provide pre-association service discovery capabilities in a compact manner by using a Bloom filter (or other probabilistic data structure) to advertise available services. The Bloom filter may be dynamically configurable, which may provide substantial flexibility and allow for different characteristics to be used in different service discovery implementation scenarios and/or at different times. The techniques may further include direct advertisement options for additional flexibility.

Such a method may, at least in some instances, provide an efficient, light-weight discovery process, which may produce limited wireless network overhead, congestion, and/or battery usage by portable devices. Additionally, such a method may provide a relatively rapid service discovery process. Furthermore, such a method may be sufficiently scalable as to provide the capability to advertise a relatively large number of services (which may help support future extensibility) and/or handle use cases with large numbers of STAs.

The pre-association service discovery techniques disclosed herein may be used in conjunction with an access network query protocol (ANQP) based 802.11u framework (such as may be used with Wi-Fi Direct Services (WFDS) and/or hotspot 2.0 (HS 2.0)), in some instances. However, it should be noted that the techniques disclosed herein may be used in conjunction with (may be applicable to) any number of other frameworks.

The method shown in FIG. 4 may be used in conjunction with any of the computer systems or devices shown in the above Figures, among other devices. Some of the method elements shown may be performed concurrently, in a different order than shown, may be substituted for by other elements, or may be omitted. Additional method elements may also be performed as desired. As shown, the methods may operate as follows.

A first wireless device 402 may generate a Bloom filter 406. A Bloom filter may be a probabilistic data structure that may serve to provide an indication (or hint) of whether a particular element is a member of a set. The Bloom filter may be configured such that it is possible to obtain a false positive result (with a configurable false positive probability depending on the configuration of the filter), but that a false negative result is not possible.

At least in some instances, the Bloom filter may take the form of a bit vector (e.g., a bit array). Generating the Bloom filter may include setting the values of the bits in the bit array according to the elements inserted into the bit array: each element to be inserted may be hashed to a specific array position of the bit array, according to each hash function of a desired set of hash functions, and all resulting bit positions of the bit array may be set to the bit value '1'.

By using services available via (offered by) the first wireless device 402 as the elements of the Bloom filter, the Bloom filter may effectively provide a 'service hint map' for various services offered by the first wireless device. For example (as described further subsequently herein) a device may test such a Bloom filter for a positive or negative indication of the availability of a specific desired service, and thereby either conclusively determine that the service is not offered, or determine with a known probability that the service may be offered.

The services offered by the first wireless device 402 may include services provided by the first wireless device 402 itself, and/or services provided by other devices communicatively coupled to the first wireless device 402 (e.g., servers, printing devices, videoconferencing equipment, test and/or measurement equipment, industrial and/or manufacturing equipment, etc.). The services offered may include any of various services, e.g., depending on the features of the first wireless device 402 and any network connections of the first wireless device 402, administrative settings, etc.

In some instances, in order to generate the Bloom filter, certain parameters of the Bloom filter may first be selected. For example, a first parameter of the Bloom filter may include the number of elements to be inserted in the Bloom filter, i.e., the number of services which are to be advertised using the Bloom filter (those services for which the Bloom filter will provide a positive indication of its availability). The number of services advertised by the Bloom filter may be all or a subset of the services that are offered by the first wireless device 402.

A second parameter of the Bloom filter may be a false positive indication rate that can result from using the Bloom filter as a service hint map. Any false positive rate (e.g., 1%, 5%, 10%, etc.) may be used, e.g., depending on design and implementation considerations (e.g., depending on the number of elements to be included in the Bloom filter, the size and/or nature of the system in which the first wireless device 402 operates, etc.).

Based on the selected false positive indication rate and the number of services advertised using the Bloom filter, a (e.g., plural) number of hash functions (and possibly more particularly a specific set of hash functions) to be used to generate the Bloom filter and a size (e.g., a number of bits) of the Bloom filter may be calculated.

As previously noted, generating the Bloom filter based on the parameters may include 'inserting' each of the services to be advertised into the service hint map. As one possibility, such insertion may include applying each of the selected hash functions to each service (e.g., itself represented by a 'service hash' or in any other desired way) being inserted and setting each resulting bit of the Bloom filter to '1'. All other bits of the Bloom filter may remain as '0'. Other techniques (or variations of this technique) for generating the Bloom filter may be used, as desired.

Service availability information (or simply "service information"), which may include the Bloom filter generated by the first wireless device 402 in 406, may be transmitted 408 to a second wireless device 404. The service availability information may be unicast to the second wireless device 404, or may be broadcast or multicast (e.g., to one or more additional wireless devices) as desired. As one possibility, the service availability information may be included in a Wi-Fi beacon, for example if the first wireless device 402 is a Wi-Fi AP. Other scenarios (e.g., ad-hoc and/or peer-to-peer implementations, in which the first wireless device 402 is a STA or group owner (GO)) are also possible. In some instances, a 'service information' information element (IE) may be defined and included in Wi-Fi beacons transmitted by the first wireless device 402 to provide the service availability information to the second wireless device 404.

In some instances, the service availability information may also include information regarding some or all of the parameters of the Bloom filter. For example, the number of services advertised in the Bloom filter and the number of hash functions used to generate the Bloom filter may be indicated as part of 'Bloom filter information' provided in conjunction with the Bloom filter itself. The second wireless device 404 may be able to calculate the false positive rate of the Bloom filter and the size of the Bloom filter based on the number of services advertised in the Bloom filter and the number of hash functions used to generate the Bloom filter, in some instances (e.g., if the second wireless device knows the manner in which the false positive rate and the size of the Bloom filter are related to the number of services and the number of hash functions). Alternatively, if desired, additional, different, or all of the parameters of the Bloom filter may be provided as part of the Bloom filter information.

In some instances, the service availability information may also include information directly advertising one or more services available via the first wireless device 402, e.g., in addition to advertising services available via the wireless device using the Bloom filter. For example, service hashes or other indications of one or more specific services available via the first wireless device 402 may be transmitted as additional fields of the service information IE or as a separate IE. Such direct advertisement of certain specifically selected services may be optional, for example to reduce incoming probe requests for particularly commonly used services in a particular scenario. If such direct advertisement of one or more services is included with the service availability information, in some instances those services which are directly advertised may be excluded from insertion into the service hint map, if desired, for example to avoid redundancy. Alternatively, some or all of those services that are directly advertised may also be inserted into the service hint map. Note that in some scenarios (e.g., if the number of services offered by a wireless device is large and the false positive probability of the service hint map is low, and/or in any of various other possible scenarios), a wireless device may determine not to include any direct advertisement service hashes in the service availability information.

The second wireless device 404 may determine availability of a ("first") service 410 via the first wireless device 402, based at least in part on the service availability information provided by the first wireless device 402.

If the service availability information includes information directly advertising one or more services, the second wireless device 404 may determine whether the first service is directly advertised. If the first service is directly advertised, it may be determined that the first service is offered by the first wireless device 402.

If the service availability information does not include information directly advertising any services, or if the service availability information does include information directly advertising one or more services, but the first service is not directly advertised, the wireless device may consult the Bloom filter (the service hint map) to determine whether the Bloom filter provides a positive or negative indication for the first service.

In some instances, consulting the Bloom filter may include applying each of the selected hash functions to the first service (e.g., represented by a service hash or otherwise in a manner consistent with the manner used to generate the Bloom filter) and checking the bit value of each resulting bit position. If any of the resulting bit positions have a bit value of '0' (i.e., are not equal to '1'), this may be a negative indication. At least in some instances, the Bloom filter may not produce false negatives, and so this may be a definitive indication that the first service is not offered by the first wireless device 402.

If, however, all of the resulting bit positions for the first service have a bit value of '1', this may be a positive indication, indicating that there is a certain probability that the first service is offered by the first wireless device 402. The probability or confidence that the first service is offered by the first wireless device 402 based on a positive indication from the Bloom filter may be directly related to the false-positive probability of the Bloom filter. For example, if a positive indication is obtained from the Bloom filter for the first service and the false-positive probability of the Bloom filter is 1%, the second wireless device 404 may be able to determine that there is at least a 99% chance that the first service is offered by the first wireless device (i.e., that there no more than a 1% chance of a false positive).

The second wireless device 404 may accordingly either proceed under the assumption that the first service is indeed offered by the first wireless device 402 (e.g., if the maximum false-positive probability of the Bloom filter is below a certain threshold) or may attempt to confirm that the first service is indeed offered (e.g., if the maximum false-positive probability of the Bloom filter is above the threshold) if a positive indication is obtained from the Bloom filter for the first service.

For example, in an exemplary implementation based on 802.11u, the second wireless device 404 might send a generic advertisement service (GAS) query relating to the first service to the first wireless device 402 if the Bloom filter indicates that the first service is available and the false-positive probability of the Bloom filter is below a false-positive threshold. In contrast, the second wireless device 404 might send a probe request to confirm that the first service is offered to the first wireless device 402 if the Bloom filter indicates that the first service is available, but the false-positive probability of the Bloom filter is above the false-positive threshold, and only proceed to send a GAS query if the probe response indicates that the first service is available via the first wireless device 402.

Thus, use of a Bloom filter for service advertisement as part of service discovery techniques in a wireless communication system may be an efficient way to improve the speed of discovery and scalability of such a system. Such a service hint map may represent a more compact way of advertising services than by directly advertising all available services, and wireless devices in such a system may be able to quickly determine that any services for which a Bloom filter provides a negative indication are not available, and may thus be deterred from sending probe requests for such services. Furthermore, at least in some instances, it may be possible (e.g., depending on design constraints and the number of services to be advertised) to obtain a sufficiently low false positive probability that probe requests for services for which a Bloom filter provides a positive indication may also be unnecessary.

Note that part or all of the method of FIG. 4 may be repeated as desired. For example, the first wireless device 402 can periodically transmit service availability information, including a Bloom filter such as described with respect to FIG. 4, e.g., with each beacon (or some subset of those beacons) transmitted by the first wireless device 402. Similarly, the second wireless device 404 (and/or any of various other wireless devices within communicative range of the first wireless device 402) might utilize such information to determine the availability of any number of services, as desired.

It should also be noted that using a Bloom filter in conjunction with service discovery techniques in wireless communication systems, such as illustrated in and described according to the method of FIG. 4, may be performed in any of a variety of different scenarios, including infrastructure mode communication scenarios, peer-to-peer communication scenarios, and/or in any of various other scenarios.

Furthermore, at least in some instances it may be possible to use any of various other probabilistic data structures (including variations on the details of the Bloom filter described with respect to FIG. 4 or probabilistic data structures of other types) in place of the Bloom filter, as desired.

Figure 5:
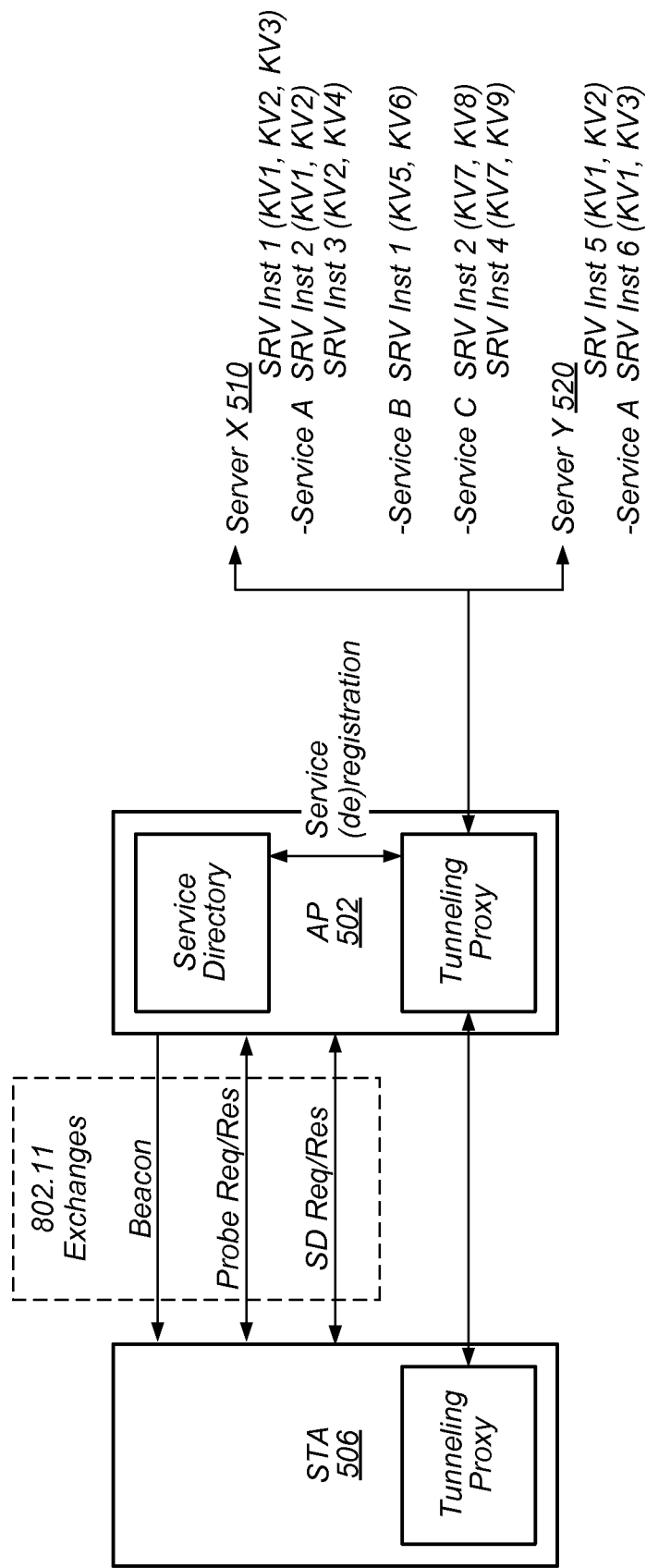
FIG. 5 illustrates aspects of an exemplary service discovery architecture, according to some embodiments.

FIG. 5—Service Discovery Architecture

FIG. 5 illustrates an exemplary service discovery architecture that may be used in a possible wireless communication system, such as according to the method of FIG. 4, according to some embodiments. In particular, FIG. 5 illustrates an exemplary architecture that may be used for service discovery between a STA and an AP using IEEE 802.11 wireless communication. Note that FIG. 5 and the information provided herein below in conjunction therewith are provided by way of example of various considerations and details relating to a possible service discovery architecture, and are not intended to be limiting to the disclosure as a whole. Numerous variations and alternatives to the details provided herein below are possible and should be considered within the scope of the disclosure.

As shown, the wireless communication system may include a STA 506 and an AP 502 The AP 502 may be communicatively coupled with one or more servers (e.g., server X 510, server Y 520), which may each provide one or more services (e.g., service A, service B, service C, etc.). Note that although not shown in FIG. 5, at least in some instances, one or more STAs associated with the AP 502 may also or alternatively provide one or more services to other STAs by way of the AP 502. The AP 502 may maintain a 'service directory' to track which services can be offered by the AP 502. Upon registering (or de-registering) with such servers and/or STAs and for such services, the AP 502 may update the service directory to reflect the updated set of services that can be offered.

Using IEEE 802.11 (Wi-Fi) communication, the STA 506 may be able to obtain information regarding the services offered by way of the AP 502. Such communication may be performed while the STA 506 and the AP 502 are 'pre-associated', i.e., while the STA 506 is not (yet) a member of a Wi-Fi network provided by the AP 502 (not a member of the AP 502's service set). For example, beacons broadcast by the AP 502 may include some service discovery related information. Additionally, the STA 506 may be able to send probe requests, to which the AP 502 may respond with probe responses, and/or the STA 506 may be able to send service discovery (SD) requests, to which the AP 502 may respond with SD responses, in order to confirm the availability (or unavailability) of and/or obtain further information regarding one or more services available by way of the AP 502.

If desired (e.g., if a desired service is offered by the AP 502), the STA 506 may associate with the AP 502. The STA 506 may subsequently obtain one or more services offered by way of the AP 502.

Figure 6:
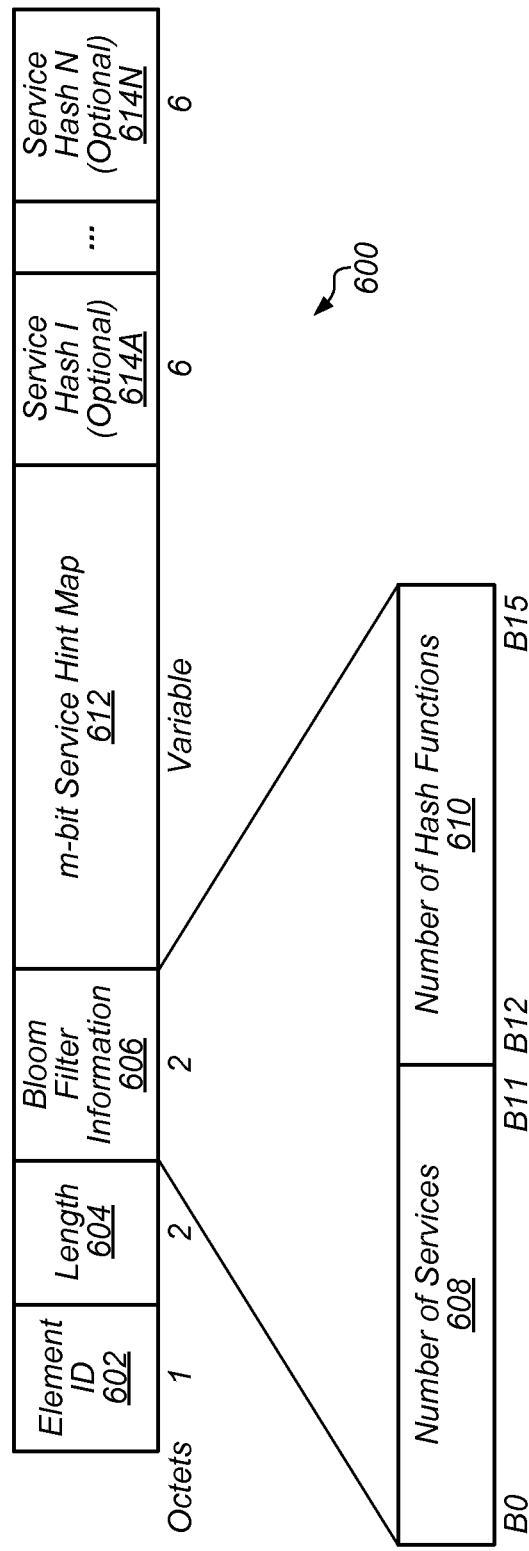
FIG. 6 illustrates an exemplary service information IE, according to some embodiments.

FIG. 6—Service Information IE

FIG. 6 illustrates an exemplary information element (IE) format 600 that may be used by a wireless device to provide service information in conjunction with service discovery in a wireless communication system such as according to the method of FIG. 4. Note that FIG. 6 and the information provided herein below in conjunction therewith are provided by way of example of various considerations and details relating to one possible IE format, and are not intended to be limiting to the disclosure as a whole. Numerous variations and alternatives to the details provided herein below are possible and should be considered within the scope of the disclosure.

In particular, the exemplary IE format 600 illustrated in FIG. 6 may be used to carry a Bloom filter configured for use as a service hint map, and information (e.g., parameters) relating to the Bloom filter, as well as optional service hashes for direct advertisement of services.

As shown, the IE may include an element ID field 602 and a length field 604, which may be used to identify the IE as carrying service information and indicate a length (e.g., in octets) of the body of the IE respectively.

The IE may also include a Bloom filter information field 606, which as previously noted may include certain information relating to the Bloom filter. For example, as shown, the Bloom filter information field may include a sub-field 608 for indicating the number of services offered by the wireless device. If this "number of services" sub-field 608 is 12 bits, as shown, a maximum number of services of 4,096 may be possible. Note that a wireless device may be able to set the value of this sub-field 608 to a lower number than the maximum value of this sub-field 608, e.g., if the wireless device offers fewer services in a particular implementation scenario. Note also that a different length may be used for this subfield 608 (e.g., to provide a different maximum number of services advertised) if desired. The Bloom filter information field 606 may also include a sub-field 610 for indicating which set of (including how many) hash functions are used by the Bloom filter. As one possibility (as shown), if this sub-field 610 is 4 bits, any of 16 different sets of hash functions may be used to generate the Bloom filter.

The Bloom filter field (or 'service hint map' field) 612 may have a variable (m-bit) length. This length may be determined in accordance with the number of services advertised (i.e., the number of elements) in the Bloom filter, and the number of hash functions used with the Bloom filter, in order to ensure that the false positive probability when using the Bloom filter is limited to a desired false positive probability.

Additionally, as shown, if desired one or more optional service hash fields 614A-614N may be included in the service information IE. Each service hash field 614 may be used to directly (explicitly) advertise the availability of a specific service (which may be represented by the service hash value included in the service hash field). As one possibility (as shown), each such field 614 may have a length of 6 octets. It may be the case that the service information IE format 600 specifies a maximum number of direct advertisement service hashes that may be included in such a service information IE, in some implementations.

Figure 7:
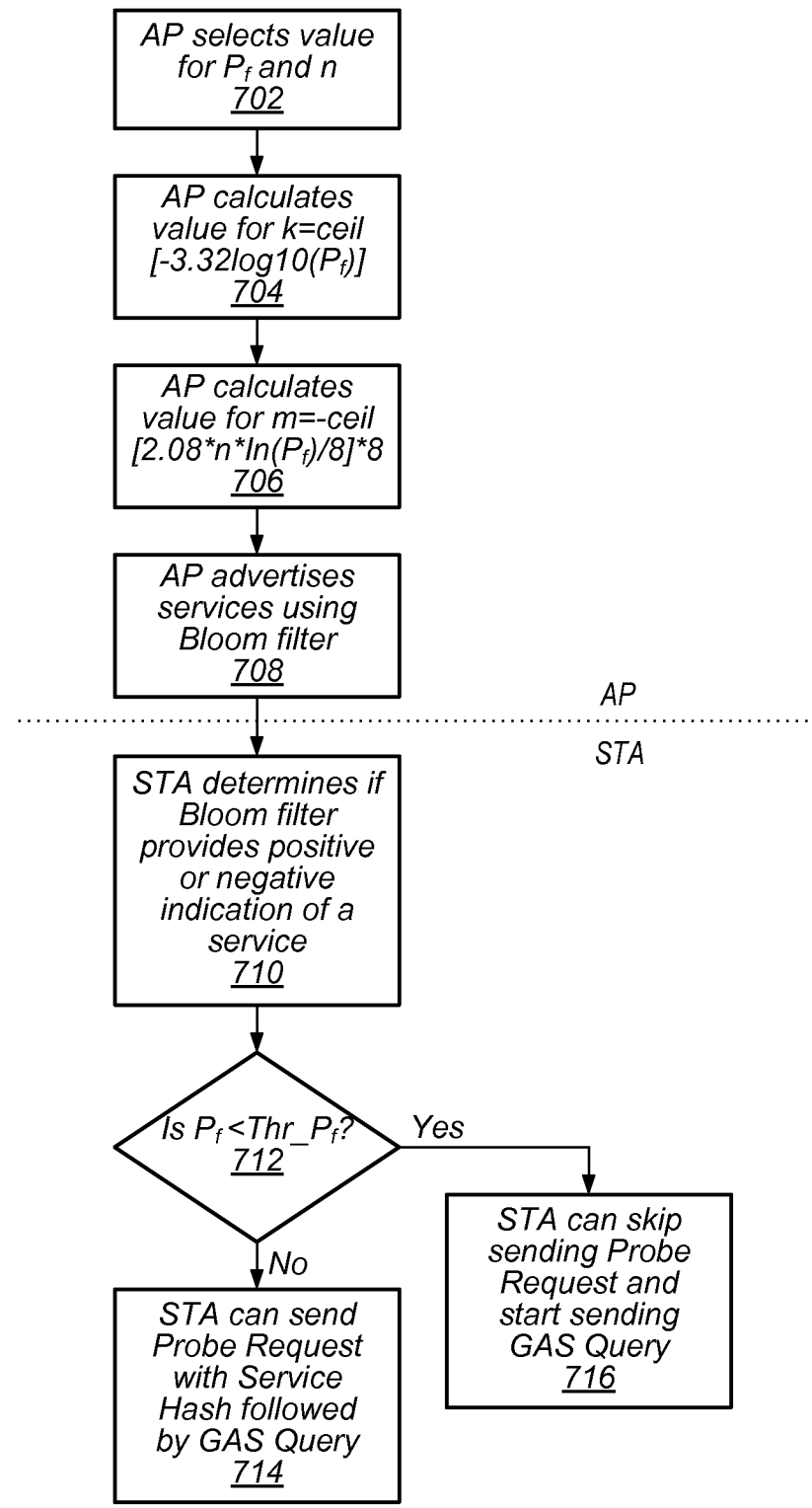
FIGS. 7-8 are flowchart diagrams illustrating exemplary service discovery techniques that include use of a Bloom filter, according to some embodiments.
Figure 8:
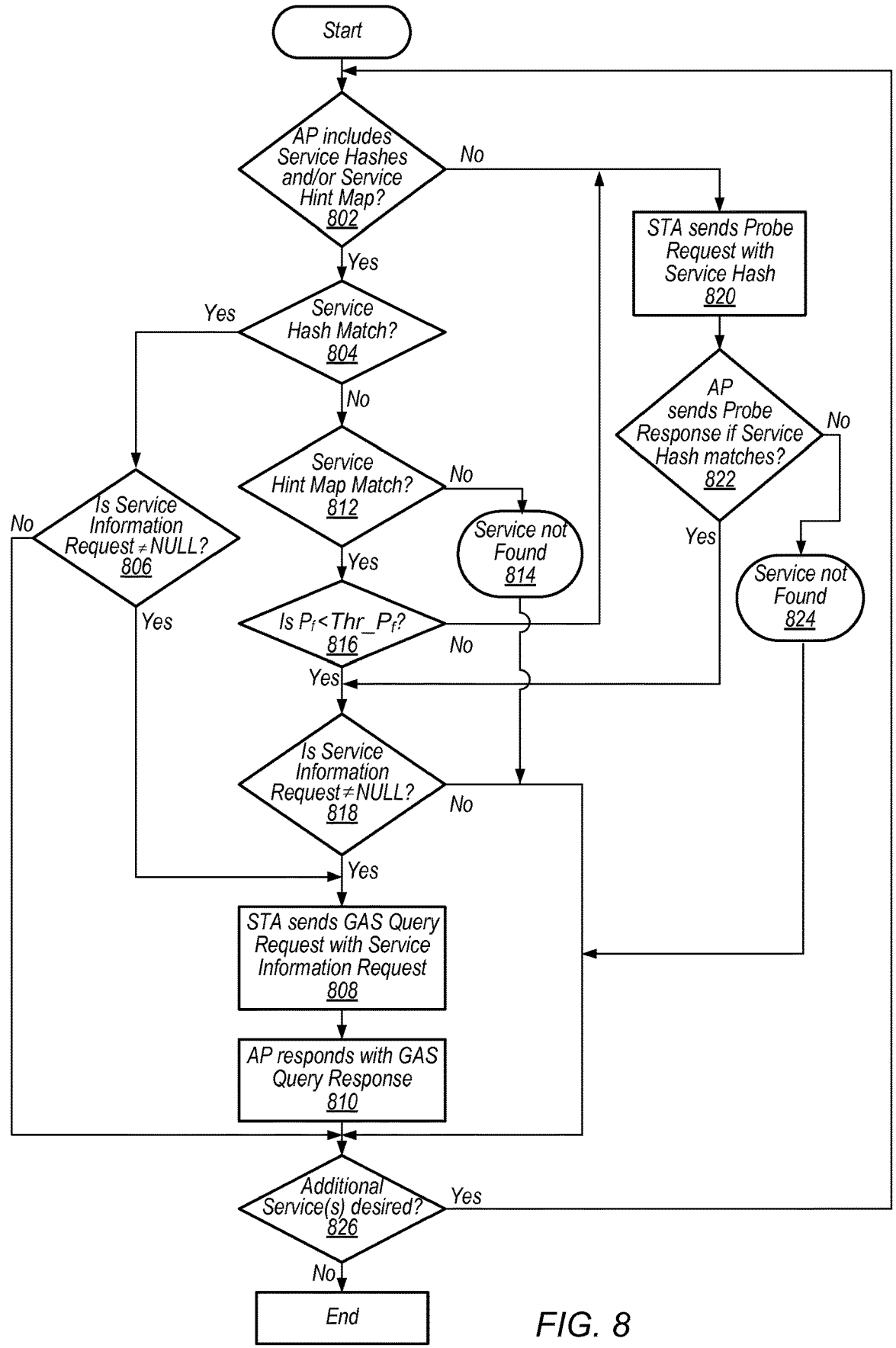

FIGS. 7-8—Flowcharts

FIGS. 7-8 illustrate exemplary details of dynamic Bloom filter operation and pre-association service discovery, which may be used, e.g., in conjunction with the method of FIG. 4, according to some implementations. Note that FIGS. 7-8 and the information provided herein below in conjunction therewith are provided by way of example of various considerations and details relating to use of a Bloom filter in conjunction with service discovery techniques, and are not intended to be limiting to the disclosure as a whole. Numerous variations and alternatives to the details provided herein below are possible and should be considered within the scope of the disclosure.

FIG. 7 illustrates exemplary aspects of possible dynamic Bloom filter operation that may be used in conjunction with pre-association service discovery, according to some embodiments. As shown, an AP configured to use a Bloom filter for advertising services, e.g., offered by that AP, may initially select a false positive probability value $P_f$ and a number of services to be advertised using the Bloom filter n (702). Selection of these values may be correlated in some instances (for example, higher n values may result in selection of higher $P_f$ values, in some instances, e.g., due to design constraints).

As shown, based at least in part on the selected n and $P_f$ values, the AP may then calculate a number of hash functions to use with the Bloom filter k (704). The following equation may be used for this calculation, as one possibility:

$$k=\text{ceil}[-3.32 \log 10(P_f)]$$

Based at least in part on the selected n and $P_f$ values, the AP may calculate a length of the Bloom filter m (706), which will result (when used in combination with the selected number of hash functions k and the selected number of services to be advertised n) in the false positive probability being $P_f$. The following equation may be used for this calculation, as one possibility:

$$m=-\text{ceil}[2.08*n*\ln(P_f)/8]*8$$

Using these selected parameters, the AP may then generate the Bloom filter (e.g., insert an element corresponding to each of the n services into an array of length m using the selected hash functions) and provide it (e.g., in beacons) to STAs within communicative range (708).

A STA receiving the Bloom filter and interested in a specific service may check whether the Bloom filter provides a positive or negative indication of the availability of that service (710). If a positive indication is obtained, the STA may further compare the value of the false positive probability $P_f$ to a configured false positive probability threshold (e.g., "Thr_$P_f$") (712).

When the false positive probability $P_f$ is at or above the configured false positive probability threshold, the STA may then send a probe request to the AP with the service hash of the desired service to confirm availability of that service (e.g., if the false positive probability is above the false positive probability threshold) and send a GAS query if a positive result is obtained (714). When the false positive probability $P_f$ is below a configured false positive probability threshold, the STA can skip the probe request and directly send a GAS query (716).

As one possibility the false positive probability threshold may be 1%. However, it should be noted that the false positive probability threshold may have any desired value according to various implementations, which may be selected in any of various ways as desired.

FIG. 8 illustrates an exemplary overall Pre-Association Discovery Flow, which may be used by a STA performing service discovery with respect to an AP, according to some embodiments. As shown, the STA may initially determine whether the AP has provided (e.g., in a beacon, or probe response or other communication) service hashes (for direct service advertisement) and/or a service hint map (e.g., a Bloom filter) (802).

If the AP has provided service hashes and/or a service hint map, the STA may determine whether any of the provided service hashes match a service that the STA is attempting to discover (804). If there is a match for the desired service, the STA may further determine whether service information requests for the service are enabled (e.g., whether a service information request flag is or is not NULL) (806). If service information requests for the service are not enabled ('no'), there may be no further information to obtain regarding the service, and pre-association service discovery may be complete for the service for which there is a service hash match. If service information requests for the service for which there is a service hash match are enabled ('yes'), the STA may send a GAS query request with a service information request to the AP (808). The AP may respond with a GAS query response, which may provide further service information regarding the service (810). This may likewise complete the pre-association service discovery process for the service for which there is a service hash match.

If the AP has provided service hashes and a service hint map, but none of the provided service hashes match the desired service, or if the AP has provided a service hint map but no service hashes, the STA may proceed to determine whether the service hint map provides a positive or negative indication for the desired service for which a service hash match is not found (812). If the service hint map provides a negative indication for the desired service, the STA may conclusively determine that the service is not offered by the AP, as there is no service hash and no service hint match (814).

If the service hint map provides a positive indication (i.e., a service hint match) for the desired service, the STA may proceed to compare the false positive probability for the service hint map to a false positive probability threshold (816). If the false positive probability is below the false positive probability threshold (e.g., 1%, or any other desired threshold), the service hint may be considered reliable and the STA may proceed determine whether service information requests for the service are enabled (e.g., whether a service information request flag is or is not NULL) (818). If service information requests for the service are not enabled ('no'), there may be no further information to obtain regarding the service, and pre-association service discovery may be complete for the service for which there is a reliable positive service hint indication. If service information requests for the service for which there is a reliable positive service hint indication are enabled (yes), the STA may proceed to send a GAS query request with a service information request corresponding to the service to the AP (808). As previously described, the AP may respond with a GAS query response (810), which may provide further service information regarding the service; in this case, the pre-association service discovery process for the service may be complete.

If the false positive probability is above the false positive probability threshold, the service hint may be considered not sufficiently reliable and the STA may send a probe request with the service hash of the service to the AP (820). Note that (as shown) the STA may similarly proceed send a probe request with the service hash of the desired service to the AP (820) if (in 802) the AP does not provide a service hint map and/or service hashes.

If the AP does not offer the service, the AP may send a probe response to the probe request (822) which indicates that the service is not available. Alternatively, if desired, the AP may simply not respond to a probe response if it does not offer a service regarding which the probe request inquires. In such a case, the STA may determine that the service is not offered by the AP (824).

If the AP provides the service, the AP may send a probe response to the probe request (822) which indicates that the service is available. In this case, the STA may proceed to determine whether service information requests for the service are enabled (818). If service information requests for the service are not enabled, there may be no further information to obtain regarding the service, and service discovery for the service may be complete. If service information requests for the service are enabled, the STA may proceed to send a GAS query request with a service information request to the AP (808). As previously described, the AP may respond with a GAS query response, which may provide further service information regarding the service (810). This may likewise complete the pre-association service discovery process for the service.

Once the pre-association service discovery process for a service is complete, it may be determined if service discovery for any additional service(s) is desired (826). If any additional service(s) is desired, a further iteration of the method of FIG. 8 may be performed for each such additional service, until pre-association service discovery is complete for all desired services. This may complete the method of FIG. 8.

FIG. 9—Hash Function Mapping Table

FIG. 9 illustrates an exemplary hash function mapping table 900 which may be used to map various values (e.g., of a field or subfield of a service information IE such as illustrated in FIG. 6) to specific hash functions or sets of hash functions (e.g., which may be used in conjunction with a Bloom filter for service discovery such as according to the method of FIG. 4), according to some embodiments. Note that FIG. 9 and the information provided herein below in conjunction therewith are provided by way of example of various considerations and details relating to hash function selection for use with a Bloom filter, and are not intended to be limiting to the disclosure as a whole. Numerous variations and alternatives to the details provided herein below are possible and should be considered within the scope of the disclosure.

The table 900 of FIG. 9 may be used in conjunction with the service information IE format 600 illustrated in FIG. 6, as one possibility. For example, as noted with respect to FIG. 6, in some instances a sub-field of a Bloom filter information field may be used to indicate a set of hash functions used with a Bloom filter. FIG. 9 illustrates one manner in which the various possible values of such a 4 bit sub-field may be mapped to specific sets of hash functions.

As shown, each possible value may map to a specific hash function (represented as 'H1', 'H2', 'H3', . . . , 'H16'), and may be used to indicate that each of the hash functions up to and including the hash function corresponding to a given value are used if the given value is indicated. Thus, the value '0001' may indicate that the two hash functions H1 and H2 are used with the Bloom filter. Similarly, the value '0010' may indicate that the three hash functions H1, H2, and H3 are used with the Bloom filter, the value '0011' may indicate that the four hash functions H1, H2, H3, and H4 are used with the Bloom filter, and so on.

In the following further exemplary embodiments are provided.

One set of embodiments may include a method for a wireless device to advertise services using a Bloom filter, the method comprising: determining a number of services advertised using the Bloom filter; determining a false positive rate of services advertised using the Bloom filter; determining a set of hash functions used with the Bloom filter; determining a size of the Bloom filter; generating the Bloom filter according to the number of services advertised, the false positive rate, the set of hash functions, and the size of the Bloom filter, wherein the Bloom filter advertises a plurality of services available via the wireless device; and transmitting the Bloom filter.

According to some embodiments, the method further comprises: transmitting Bloom filter information indicating the number of services advertised using the Bloom filter and the set of hash functions used with the Bloom filter.

According to some embodiments, the method further comprises: transmitting information directly advertising one or more services available via the wireless device in addition to advertising services available via the wireless device using the Bloom filter.

According to some embodiments, the Bloom filter is transmitted in an information element (IE) as part of a Wi-Fi beacon.

A further set of embodiments may include a wireless device, comprising: a radio; and a processing element operatively coupled to the radio; wherein the radio and the processing element are configured to: select a plurality of parameter values for a probabilistic data structure; generate the probabilistic data structure using the selected plurality of parameter values, wherein the probabilistic data structure provides a service hint map for a plurality of services available via the wireless device; and wirelessly transmit the probabilistic data structure.

According to some embodiments, wherein the probabilistic data structure comprises a Bloom filter.

According to some embodiments, the plurality of parameter values comprise one or more of: a number of services advertised using the Bloom filter; a false positive rate of services advertised using the Bloom filter; a set of hash functions used with the Bloom filter; or a size of the Bloom filter.

According to some embodiments, the radio and the processing element are further configured to: wirelessly transmit an indication of one or more of the plurality of parameter values for the Bloom filter.

According to some embodiments, the radio and the processing element are further configured to: wirelessly transmit information directly advertising one or more services available via the wireless device in addition to advertising services available via the wireless device using the Bloom filter.

Yet another set of embodiments may include a method, comprising: receiving information regarding services available via a first wireless device at a second wireless device, wherein the information comprises a Bloom filter and one or more parameters of the Bloom filter; and determining whether the Bloom filter indicates that at least a first service is or is not available via the first wireless device.

According to some embodiments, the method further comprises: determining a false-positive probability of the Bloom filter; and if the Bloom filter indicates that the first service is available and the false-positive probability of the Bloom filter is below a false-positive threshold, sending a generic advertisement service (GAS) query to the first wireless device regarding the first service.

According to some embodiments, the method further comprises, if the Bloom filter indicates that the first service is available and the false-positive probability of the Bloom filter is above a false-positive threshold: sending a probe request to the first wireless device regarding the first service; receiving a probe response indicating whether or not the first service is available via the first wireless device; and if the first service is available via the first wireless device, sending a generic advertisement service (GAS) query to the first wireless device regarding the first service.

According to some embodiments, the information regarding services available via the first wireless device further comprises information directly indicating availability of one or more services via the first wireless device.

According to some embodiments, the one or more parameters comprise a number of services advertised using the Bloom filter and a set of hash functions used with the Bloom filter.

According to some embodiments, the method further comprises: calculating a false positive rate of the Bloom filter based on a number of hash functions used with the Bloom filter.

According to some embodiments, the method further comprises: calculating a length of the Bloom filter based on the false positive rate of the Bloom filter and the number of services advertised using the Bloom filter.

According to some embodiments, the information is received in a Wi-Fi beacon.

Another set of embodiments may include a wireless device, comprising: a radio; and a processing element operatively coupled to the radio; wherein the radio and the processing element are configured to implement any or all parts of any of the methods of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

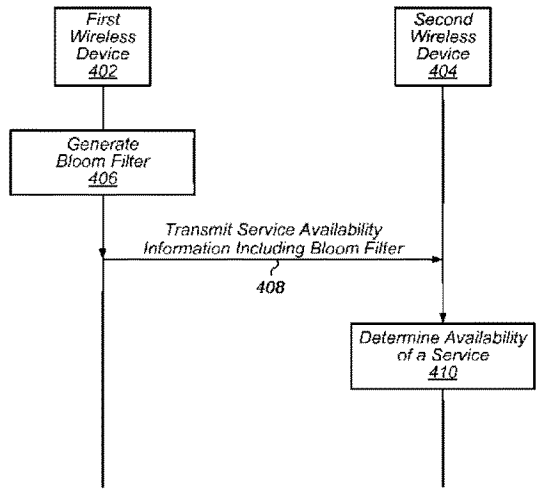

We claim:

1. A wireless device, comprising:
   a radio; and
   a processing element operatively coupled to the radio;
   wherein the radio and the processing element are configured to:
   select a plurality of parameter values for use in generating a probabilistic data structure;
   generate, using the selected plurality of parameter values, the probabilistic data structure, wherein the probabilistic data structure provides a service hint map for at least one service available via the wireless device;
   wirelessly transmit the probabilistic data structure; and
   wirelessly transmit an indication of one or more of the plurality of parameter values used to generate the probabilistic data structure, wherein a false-positive probability associated with the probabilistic data structure can be determined using the indication of one or more of the plurality of parameter values.

2. The wireless device of claim 1,
   wherein the probabilistic data structure comprises a Bloom filter, wherein the selected plurality of parameter values describe a design and/or implementation of the Bloom filter.

3. The wireless device of claim 1, wherein the plurality of parameter values comprise one or more of:
   a number of services advertised using the probabilistic data structure;
   a false positive rate of services advertised using the probabilistic data structure;
   a set of hash functions used with the probabilistic data structure; or a size of the probabilistic data structure.

4. The wireless device of claim 1, wherein the radio and the processing element are further configured to:
   wirelessly transmit information directly advertising one or more services available via the wireless device in addition to advertising services available via the wireless device using the probabilistic data structure.

5. The wireless device of claim 1, wherein the probabilistic data structure is wirelessly transmitted as part of a Wi-Fi beacon.

6. A method for discovering services advertised by a first wireless device, comprising:
   by a second wireless device:
   receiving information regarding services available via the first wireless device, wherein the information comprises:
     a Bloom filter; and
     an indication of one or more parameters of the Bloom filter, wherein a false-positive probability of the Bloom filter can be determined using the indication of one or more parameters of the Bloom filter; and
   determining whether the Bloom filter indicates that at least a first service is or is not available via the first wireless device.

7. The method of claim 6, the method further comprising:
   determining the false-positive probability of the Bloom filter; and
   if the Bloom filter indicates that the first service is available and the false-positive probability of the Bloom filter is below a false-positive threshold, sending a generic advertisement service (GAS) query to the first wireless device regarding the first service.

8. The method of claim 7, the method further comprising, if the Bloom filter indicates that the first service is available and the false-positive probability of the Bloom filter is above a false-positive threshold:
   sending a probe request to the first wireless device regarding the first service;
   receiving a probe response indicating whether the first service is available via the first wireless device; and
   if the first service is available via the first wireless device, sending a generic advertisement service (GAS) query to the first wireless device regarding the first service.

9. The method of claim 6,
   wherein the information regarding services available via the first wireless device further comprises information directly indicating availability of one or more services via the first wireless device.

10. The method of claim 6,
    wherein the indication of one or more parameters includes an indication of a number of services advertised using the Bloom filter and a set of hash functions used with the Bloom filter.

11. The method of claim 10, the method further comprising:
    calculating the false-positive probability of the Bloom filter based on a number of hash functions used with the Bloom filter.

12. The method of claim 11, the method further comprising:
    calculating a length of the Bloom filter based on the false-positive probability of the Bloom filter and the number of services advertised using the Bloom filter.

13. The method of claim 6,
    wherein the information is received in a Wi-Fi beacon.

14. A second wireless device, comprising:
    a radio; and
    a processor operatively coupled to the radio;
    wherein the radio and the processor are configured to:
    receive information regarding services available via a first wireless device, wherein the information includes:
      a probabilistic data structure; and
      an indication of one or more parameters used to generate the probabilistic data structure; and
    determine whether the probabilistic data structure provides a positive or negative indication of the availability via the first wireless device of each of one or more services.

15. The second wireless device of claim 14, wherein the radio and the processor are further configured to:
    determine that a first service is not available via the first wireless device if the probabilistic data structure provides a negative indication of the availability via the first wireless device of the first service.

16. The second wireless device of claim 14, wherein the radio and the processor are further configured to:
    determine a false-positive probability of the probabilistic data structure based at least in part on the indication of one or more parameters used to generate the probabilistic data structure.

17. The second wireless device of claim 14, wherein the radio and the processor are further configured to:
    calculate one or more additional parameters of the probabilistic data structure based at least in part on the indication of one or more parameters used to generate the probabilistic data structure.

18. The second wireless device of claim 14,
wherein the information regarding services available via the first wireless device further comprises information directly indicating availability of one or more services via the first wireless device.

19. The second wireless device of claim 14,
wherein the probabilistic data structure comprises a Bloom filter, wherein the indication of one or more parameters used to generate the probabilistic data structure is distinct from the Bloom filter.

20. The second wireless device of claim 16, wherein the radio and the processor are further configured to:
if the false-positive probability of the probabilistic data structure is below a false-positive threshold, send a generic advertisement service (GAS) query to the first wireless device regarding the first service.

* * * * *

UNITED STATES PATENT AND TRADEMARK OFFICE
CERTIFICATE OF CORRECTION

PATENT NO. : 11,265,385 B2
APPLICATION NO. : 14/721630
DATED : March 1, 2022
INVENTOR(S) : Su Khiong Yong et al.

It is certified that error appears in the above-identified patent and that said Letters Patent is hereby corrected as shown below:

On the Title Page

Please delete the Title Page and insert the Title Page shown on the attached page In the Claims Column 19, Line 13, delete "device;" and insert --device and the plurality of parameter values used to generate the probabilistic data structure comprises a number of services advertised using the probabilistic data structure;--
Column 19, Line 15, delete "wirelessly transmit an indication of one or more of the plurality of parameter values used to generate the probabilistic data structure, wherein a false-positive probability associated with the probabilistic data structure can be determined using the indication of one or more of the plurality of parameter values." and insert --separately from the probabilistic data structure, wirelessly transmit an indication of the number of services advertised using the probabilistic data structure.--
Column 19, Line 28, delete "values;" and insert --values further--
Column 19, Line 29, delete "a number of services advertised using the probabilistic data structure;"
Column 19, Line 45, delete "for discovering services advertised by a first wireless device,"
Column 19, Line 48, delete "receiving information regarding services available via the" and insert --receiving at least one information message regarding services available via a--
Column 19, Line 48, delete "the information compries:" and insert --the at least one information message comprises:--
Column 19, Line 51, delete "a Bloom filter" and insert --a first field comprising a Bloom filter--
Column 19, Line 52, delete "an indication of one or more parameters of the Bloom filter, wherein" and insert --a second field, distinct from the first field, comprising an indication of one or more parameters of the Bloom filter, wherein the indication of one or more parameters of the Bloom filter comprises an indication of a number of services advertised by the first wireless device and--
Column 20, Line 13, delete "wherein the information" and insert --wherein the at least one information message--
Column 20, Line 21, delete "an indication of a number of services advertised using the Bloom filter Signed and Sealed this
Sixth Day of June, 2023

Katherine Kelly Vidal
*Director of the United States Patent and Trademark Office* and"
Column 20, Line 34, delete "wherein the information" and insert --wherein the at least one information message regarding services available via the first wireless device--
Column 20, Line 45, delete "and determine whether" and insert --determine that--
Column 20, Line 47, delete "or negative"
Column 20, Line 48, delete "each of the one or more services" and insert --a first service; and
   in response to the determination that the probabilistic data structure provides the positive indication of the availability via the first wireless device of the first service:
   determine a false-positive probability of the probabilistic data structure based at least in part on the indication of one or more parameters used to generate the probabilistic data structure; and
   compare the false-positive probability of the probabilistic data structure with a false positive threshold.--
Column 20, Line 53, delete "first service" and insert --second service--
Column 20, Line 54, delete "of the" and insert --of--
Column 20, Line 55, delete "first service" and insert --second service--
Column 21, Line 14, delete "below a" and insert --below the--
Column 21, Line 17, add --21. The second wireless device of claim 15,
   wherein the indication of one or more parameters comprises an indication of a number of services advertised via the probabilistic data structure.--

United States Patent
Yong et al.

(10) Patent No.: US 11,265,385 B2
(45) Date of Patent: Mar. 1, 2022

(54) DYNAMIC BLOOM FILTER OPERATION FOR SERVICE DISCOVERY

(71) Applicant: Apple Inc., Cupertino, CA (US)

(72) Inventors: Su Khiong Yong, Palo Alto, CA (US); Christiaan A. Hartman, San Jose, CA (US); Kristen A. McIntyre, Fremont, CA (US); Yong Liu, Campbell, CA (US); Chiu Ngok E. Wong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1768 days.

(21) Appl. No.: 14/721,630

(22) Filed: May 26, 2015

(65) Prior Publication Data

US 2015/0363704 A1 Dec. 17, 2015

Related U.S. Application Data

(60) Provisional application No. 62/010,544, filed on Jun. 11, 2014.

(51) Int. Cl.
*H04L 29/08* (2006.01)
*H04L 67/51* (2022.01)
*H04W 4/50* (2018.01)

(52) U.S. Cl.
CPC ............... *H04L 67/16* (2013.01); *H04W 4/50* (2018.02)

(58) Field of Classification Search
CPC .......... H04L 67/16; H04W 4/001; H04W 4/20
(Continued)

(56) References Cited

U.S. PATENT DOCUMENTS

| 7,333,464 B2 * | 2/2008 | Yang ...................... H04L 67/16 370/252 |
| 7,535,884 B2 * | 5/2009 | Stephenson ....... H04W 52/0216 370/311 |

(Continued)

FOREIGN PATENT DOCUMENTS

| CN | 101242431 A | 8/2008 |
| CN | 101873335 A | 10/2010 |
| WO | 2015009097 | 1/2015 |

OTHER PUBLICATIONS

Goering et al., "Service Discovery Using Bloom Filters", Proceedings of the twelfth annual conference of the Advanced School for Computing and Imaging (ASCI), p. 219-227, Jun. 2006.*
(Continued)

*Primary Examiner* — Tsu-Chang Lee
(74) *Attorney, Agent, or Firm* — Kowert, Hood, Munyon, Rankin & Goetzel, P.C.

(57) ABSTRACT

This disclosure relates to service discovery using a dynamically configurable Bloom filter. According to some embodiments, various parameters of the Bloom filter may be determined by a first wireless device. The parameters may include a number of services advertised using the Bloom filter, a false positive rate of the Bloom filter, a set of hash functions used with the Bloom filter, and/or a size of the Bloom filter. The Bloom filter may be generated according to the determined parameters. The Bloom filter, along with some or all of the parameters of the Bloom filter, may be transmitted by the first wireless device. A second wireless device may use the Bloom filter as part of a service discovery process to determine whether or not a desired service is available via the first wireless device.

21 Claims, 7 Drawing Sheets